(12) United States Patent
Bossi et al.

(10) Patent No.: US 7,507,312 B2
(45) Date of Patent: Mar. 24, 2009

(54) USING LASER SHOCK LOADS TO DEBOND STRUCTURES

(75) Inventors: Richard H. Bossi, Renton, WA (US); Val G. Brustad, Kent, WA (US)

(73) Assignee: The Boeing Company, Chicago, IL (US)

( * ) Notice: Subject to any disclaimer, the term of this patent is extended or adjusted under 35 U.S.C. 154(b) by 612 days.

(21) Appl. No.: 11/209,986

(22) Filed: Aug. 23, 2005

(65) Prior Publication Data
US 2007/0051469 A1    Mar. 8, 2007

(51) Int. Cl.
*B32B 38/10* (2006.01)
(52) U.S. Cl. .................. 156/344; 29/402.03; 29/403.3; 29/426.4
(58) Field of Classification Search .................. 156/344, 156/584; 29/402.03, 403.3, 426.1, 426.4
See application file for complete search history.

(56) References Cited

U.S. PATENT DOCUMENTS

| | | | |
|---|---|---|---|
| 5,895,589 A | 4/1999 | Rogers et al. | |
| 6,236,446 B1 * | 5/2001 | Izumi et al. | 349/187 |
| 6,558,493 B1 | 5/2003 | Ledger et al. | |
| 6,716,297 B2 | 4/2004 | Essig et al. | |
| 6,770,838 B1 * | 8/2004 | Clement et al. | 219/121.61 |
| 6,848,321 B2 | 2/2005 | Bossi et al. | |

OTHER PUBLICATIONS

Greg P. Carman, Structural & Solid Mechancs MAE Department UCLA.
Bossi et al., Laser Bond Inspection Device for Composites, Jun. 2004.
Bossi et al., Application of Stress Waves to Bond Inspection, May 16-20, 2004.
Bossi et al., Using Shock Loads to Measure Bonded Joint Strength, Nov. 2002.

* cited by examiner

*Primary Examiner*—Mark A Osele
(74) *Attorney, Agent, or Firm*—Harness, Dickey & Pierce, P.L.C.

(57) ABSTRACT

A method of disassembling at least a portion of a structure that includes parts which are bonded together. The method includes selecting a subsurface depth within the structure at which it is desired to cause debonding of the structure. A laser beam diameter, pulse width and power level predetermined to produce a peak tensile stress within the structure at the selected depth are selected. A laser having the selected beam diameter is used to apply a shock load at the selected pulse width and power level to the structure. Using this method, damaged or unwanted aircraft skin, patches or overlays on structure can be removed more cleanly and simply than milling, grinding or other mechanical methods.

11 Claims, 2 Drawing Sheets

USING LASER SHOCK LOADS TO DEBOND STRUCTURES

FIELD OF THE INVENTION

The present invention relates to structures having parts which are bonded together and more particularly (but not exclusively) to using a laser to selectively apply a shock load to cause debonding of a subsurface portion of a structure.

BACKGROUND OF THE INVENTION

Composite materials are widely used in aircraft applications. It is not unusual for aircraft to incur accidental damage in the course of everyday airport operations and maintenance. Repairing impact damage typically involves the removal of material over bonded substructure joints. Removing composite material over regions of strong bonds can be an arduous and dirty task which involves cutting, grinding and/or machining tough material.

SUMMARY OF THE INVENTION

The present invention, in one aspect, is directed to a method of disassembling at least a portion of a structure that includes parts which are bonded together. The method includes selecting a subsurface depth within the structure at which it is desired to cause debonding of the structure. A laser beam diameter, pulse width and power level predetermined to produce a peak tensile stress within the structure at the selected depth are selected. A laser having the selected beam diameter is used to apply a shock load at the selected pulse width and power level to the structure.

In another aspect, the invention is directed to a method of disassembling at least a portion of a structure that includes parts which are bonded together. The method includes selecting a subsurface area of the structure at a depth within the structure at which it is desired to cause debonding. The method also includes selecting a laser fluence, pulse width and direction predetermined to cause compression and then tension within the structure sufficient to debond at least a selected part of the selected subsurface area. A laser at the selected pulse width is applied in the selected direction to the selected subsurface area to produce the selected fluence.

In yet another aspect, the invention is directed to a method of working on an aircraft structure. The method includes applying to the structure a laser beam configured to result in a peak tensile stress in a designated area of a subsurface bond layer of the structure to debond at least part of the area, and removing a portion of the structure adjacent the debonded area.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawing, wherein.

DETAILED DESCRIPTION OF EMBODIMENTS

Figure 1:
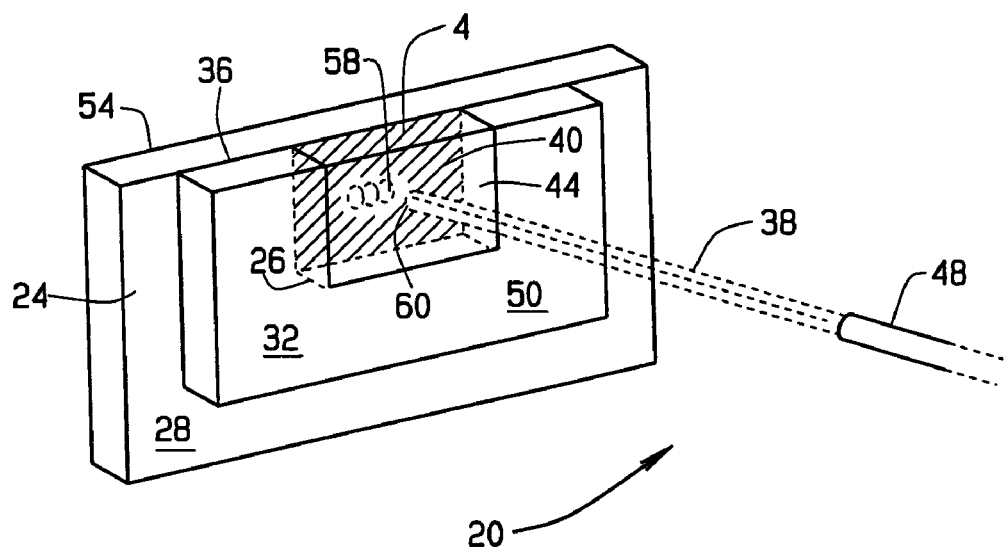
FIG. 1 is a perspective view of an apparatus for disassembling at least a portion of a structure in accordance with one implementation of the invention.

The following description of various embodiments of the present invention is merely exemplary in nature and is in no way intended to limit the invention, its application, or uses. Although one or more implementations are described with reference to composite structures, the invention is not so limited. Implementations also are contemplated in connection with structures including materials other than or in addition to composite materials. For example, the invention could be practiced relative to structures in which composites or metals are bonded to metals such as titanium and/or aluminum. Furthermore, implementations of the invention are contemplated not only in aerospace applications but also in relation to many other applications in which selective debonding may be desirable.

Various implementations of the invention are directed to using laser-generated stress waves to break bonds within a composite structure. More specifically and for example, a controlled shock wave may be applied at a selected location along a surface of the structure to debond the structure at a selected depth and direction from the selected location. In such manner, the structure may be disassembled for repair purposes.

In one implementation, the invention is directed to a method of disassembling at least a portion of a structure that includes parts which are bonded together. Such a structure could be, for example, a composite aircraft component or other laminate structure. "Parts which are bonded together" thus includes composite and/or laminate layers. The present method could be used, for example, in removing a damaged portion of an aircraft composite structure for repair purposes. A subsurface depth within the structure is selected at which it is desired to cause debonding of the structure. A laser beam diameter, pulse width and power level are selected which are predetermined to produce a peak tensile stress within the structure at the selected depth. A laser having the selected beam diameter is used to apply a shock load at the selected power level to the structure.

A perspective view of an exemplary apparatus for disassembling at least a portion of a structure is indicated generally in the Figure by reference number 20. A structure 24 includes parts 28 and 32 which are bonded together at a subsurface bond layer 36. In the present example, a user desires to use the apparatus 20 to debond an area 40 (shown in the Figure as hashed) within the layer 36, at a subsurface depth 26 from a front surface 50 of the structure 24, for example, to facilitate the removal of a portion 44 of the part 32 from the structure 24. The selection by a user of a subsurface depth and area for debonding is dependent, for example, on size(s) and location (s) of portion(s) to be removed from the structure. Depth and area selection may also depend on a variety of other factors, e.g., contours and thickness of a part, material(s) of which the part is made, and available laser power.

A laser exciter 48 is configured to apply a shock load to the structure 24 to cause debonding of the layer 36. Specifically, the laser exciter 48 is configured to apply a laser beam to the structure 24 at a structure surface location, power level and beam diameter predetermined to result in a peak tensile stress to cause debonding in the selected area 40.

Before debonding is performed, the structure 24 (or one similar to the structure 24) may be subjected to testing to determine a bond failure threshold in the area 40. Testing may be performed, for example, in accordance with methods and systems described in Bossi et al., U.S. Pat. No. 6,848,321, assigned to the assignee hereof. The disclosure of U.S. Pat. No. 6,848,321 is incorporated herein by reference in its entirety.

One implementation of a method of disassembling at least a portion of the structure 24 includes selecting an area of the bond layer 36 in which it is desired to cause debonding. In the present example and as shown in FIG. 1, the area 40 is selected, although (as mentioned above) other areas and subsurface depths could be selected. A shock load is applied to produce a peak tensile stress within the structure 24 at the selected bond layer 36 to debond at least part of the selected bond layer area 40.

Figure 2:
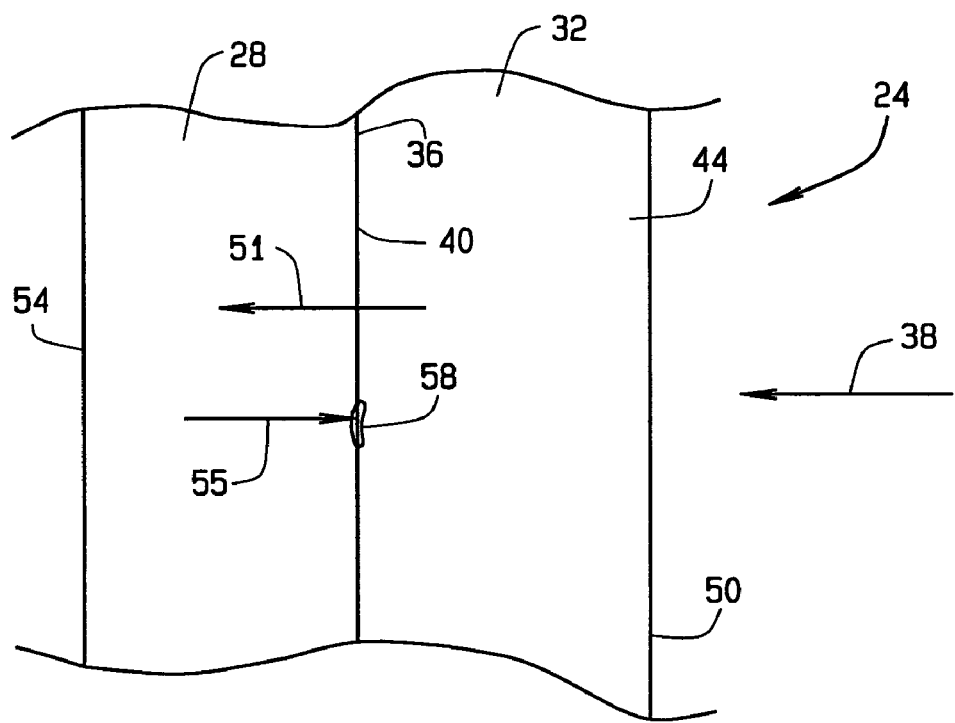
FIG. 2 is a cross-sectional view of a structure relative to which laser energy is applied in accordance with one implementation of the invention.

A cross-sectional view of the structure 24 is shown in FIG. 2. When the apparatus 20 is in operation, laser energy 38 is deposed at the front surface 50 of the structure 24 which generates a compressive stress wave 51. The compressive stress wave 51 is propagated to a rear surface 54 of the structure 24 and is reflected to form a tensile wave 55 that moves toward the front surface 50. The tensile wave 55 produces peak tensile stress at the bond layer 36 and thereby causes debonding, substantially within a spot 58. The laser exciter 48 and/or structure 24 subsequently may be repositioned one or more times to depose laser energy at additional location(s) on the front surface 50, to debond other spots in the area 40. In such manner, the debonding in the spot 58 may be propagated in the bond layer area 40. Debonding may be propagated continuously, for example, where the structure 24 is translated relative to the laser beam in increments less than a diameter of the laser beam 38. When debonding is completed as desired in the area 40, debonded portion(s) of parts 32 and/or 28 may be removed by mechanical means such as sawing or chiseling.

Figure 3:
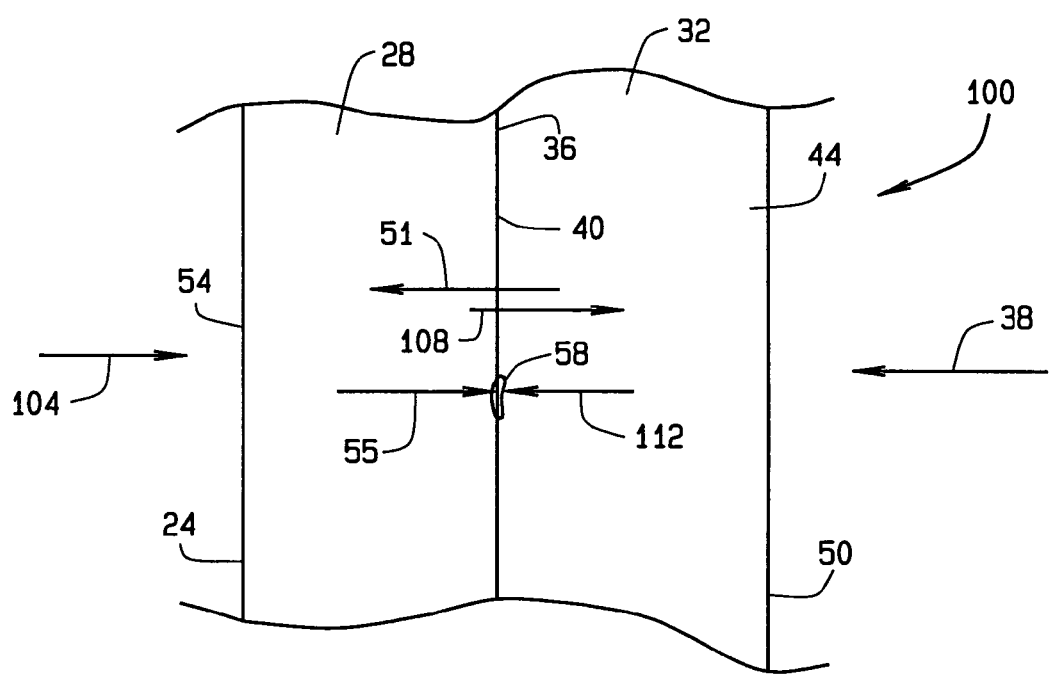
FIG. 3 is a cross-sectional view of a structure relative to which laser energy is applied in accordance with one implementation of the invention.

Another exemplary implementation is indicated generally in FIG. 3 by reference number 100. A second laser exciter may be used to deliver an auxiliary beam 104 from another direction relative to the structure 24, e.g., through the surface 54, in cooperation with the beam 38 to debond the spot 58. The beam 104 generates a compressive stress wave 108 that is reflected against the front surface 50 to form a tensile wave 112. The beams 38 and 104 may be delivered essentially simultaneously, and their wave speeds may be shifted relative to each other, for example, such that the reflected waves cause a peak tension at the spot 58. Thus, by appropriate timing of pulses of the beams 38 and 104, the tensile stress waves 55 and 112 can be optimized relative to depth of the structure 24 to achieve debonding at a desired location.

In the exemplary views shown in FIGS. 1 and 2, laser energy 38 is applied in a direction substantially normal to the front surface 50. It should be understood, however, that another direction of laser application could be selected by a user, dependent on various factors, e.g., direction(s) in which lamination(s) may be oriented, contours and thickness(es) of a part, a selected depth at which debonding is desired, composition of the part, etc.

In some implementations, a flat black paint (not shown) could be applied to the front surface 50 of the structure to aid in absorbing the laser beam 38. In some implementations, a water film (not shown) could be applied to the front surface 50 to provide an overlay for confining pressure proximate an area 60 in which the laser beam 38 impacts the structure.

Laser power level and beam diameter may be determined based on material type and thickness and bond strength. For example, the laser may be operated initially at a low power level and power may be stepped up to determine an appropriate power level. Ultrasonic testing may be used to validate at what power level, and at what depth in a structure, significant debonding can be achieved. Laser fluence and/or exposure area of spot(s) 58 may be selected based on a bond failure threshold of the bond layer 36 determined, for example, by means of testing as previously described. In some implementations, debonding is performed close to the bond failure threshold. Additionally or alternatively, where a bond failure threshold is low, a laser generating, for example, 50 Joules per square centimeter could be used to debond large spot areas, e.g., spots having diameters between about one and two centimeters. Factors affecting debonding applications can include material thickness, bond location, spot 58 diameter, and laser fluence and pulse width. The laser exciter 48 is typically a high-power short-burst laser, for example, a laser producing 50 or more Joules per square centimeter at a pulse width of less than about one microsescond. Pulse width is preferably between about 100 and 300 nanoseconds. When a 50-Joule-per-square-centimeter laser having a 1-centimeter diameter beam is used, debonding spots typically range between 1 and 2 centimeters in diameter.

In some implementations in which debonding is performed, the location of a debonding crack relative to a structure back surface generally corresponds to the distance a stress wave travels during a time interval equal to a pulse width of the laser beam, where the reflected stress wave clears the trailing edge of the compressive wave incident on the back surface to generate a maximum tensile wave stress. Accordingly, a pulse width of the shock load to be applied may be selected based at least partly on an estimated debonding location relative to a surface of the structure 24.

Various methods and apparatus of the present invention are useful in relation to aircraft and/or aerospace applications. Some implementations, for example, are useful in the repair of impact damage to aircraft composite structures. One method of working on an aircraft structure includes applying to the structure a laser beam configured to result in a peak tensile stress in a designated area of a subsurface bond layer of the structure to debond at least part of the area. A portion of the structure adjacent the debonded area then is removed.

The foregoing methods and apparatus make it possible to debond a joint at specific locations to allow clean and easy removal of top layers such as aircraft skin from underlying substructure. A controlled shock wave can be applied to fail a bond line at a specific location along a surface and at a prescribed depth from the surface. Debonding can be performed to produce interfacial failures, failures of adhesive and/or laminate failures. The invention can be implemented relative to both paste- and film-bonded materials. Implementations of the present invention offer a way to remove damaged or unwanted aircraft skin, patches or overlays on structure. Such removal is cleaner and simpler than milling, grinding or other mechanical methods currently in use.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of working on an aircraft structure comprising:

applying to the structure a laser beam configured to result in a peak tensile stress in a designated area of a subsurface bond layer of the structure to debond at least part of the area; and removing a portion of the structure adjacent the debonded area;

the method further comprising applying a single laser pulse to the structure a predetermined distance from a bond layer area debonded by a previous laser pulse.

2. The method of claim 1, further comprising:

selecting a subsurface depth within the structure at which it is desired to cause debonding of the structure;

selecting a laser beam diameter, pulse width and power level predetermined to produce a peak tensile stress within the structure at the selected depth; and using a laser having the selected beam diameter to apply a shock load at the selected pulse width and power level to the structure.

3. The method of claim 2, further comprising selecting a fluence and an exposure spot area for the shock load based on a bond failure threshold of the structure.

4. The method of claim 2, further comprising using a plurality of lasers to apply a plurality of shock loads to the structure from a plurality of directions to produce the peak tensile stress.

5. The method of claim 1, further comprising:

selecting a laser fluence, pulse width and direction predetermined to cause compression and then tension within the structure sufficient to debond at least a selected part of the selected subsurface area; and applying a laser at the selected pulse width in the selected direction to the selected subsurface area to produce the selected fluence.

6. The method of claim 1, performed a plurality of times to propagate debonding.

7. The method of claim 1, further comprising producing in the structure at least one of the following: an interfacial failure, a failure of adhesive, and a laminate failure.

8. The method of claim 1, further comprising providing a laser exciter to apply the laser beam.

9. The method of claim 8, wherein the laser beam is applied from a first direction relative to the structure, the method further comprising providing a second laser exciter to apply an auxiliary beam to the structure from a second direction relative to the structure.

10. The method of claim 1, wherein applying a laser beam comprises applying a 50-Joule-per-square-centimeter laser at a pulse width between 100 and 300 nanoseconds.

11. The method of claim 1, wherein the predetermined distance includes between one centimeter and two centimeters.

* * * * *